Patented Oct. 23, 1928.

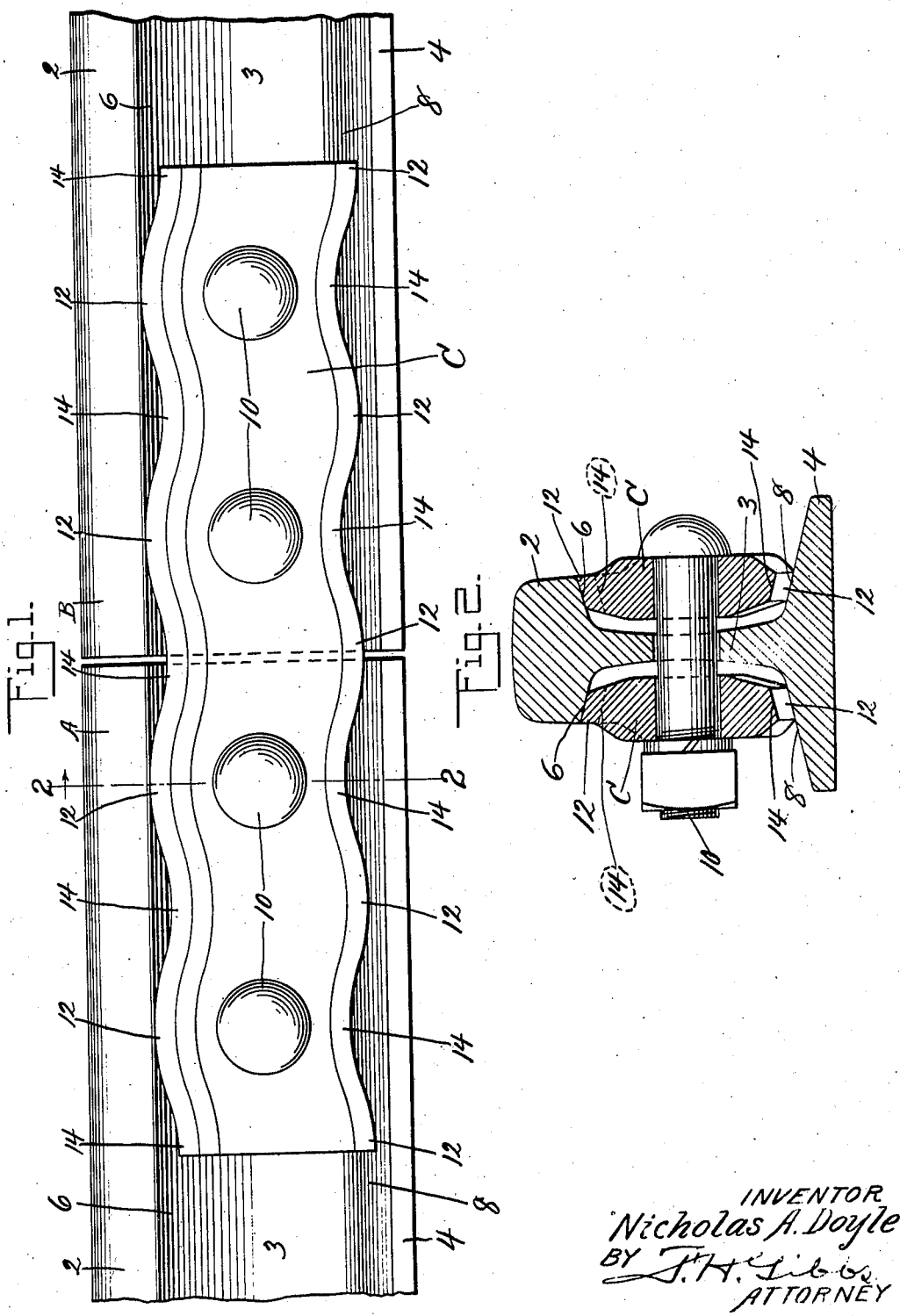

1,689,169

UNITED STATES PATENT OFFICE.

NICHOLAS A. DOYLE, OF ST. LOUIS, MISSOURI, ASSIGNOR TO AMERICAN CAR AND FOUNDRY COMPANY, OF NEW YORK, N. Y., A CORPORATION OF NEW JERSEY.

RAIL JOINT.

Application filed April 28, 1928. Serial No. 273,609.

This invention relates generally to rail joints and has particular reference to a splice bar therefor which is so constructed as to provide increased flexibility at the juncture of adjacent rail ends whereby to enable it to more readily adapt itself to the wave motion in the rails.

One object of the invention is to provide a multiplicity of staggered bearing contacts between the fishing surfaces of the rails and the splice bar.

The usual rail joint formed by a splice bar which continuously fits and engages the fishing surfaces of adjacent rails receives what may be termed a hammer and anvil effect from pounding of the wheels since the rails are held together by joints which are not relieved at any point of contact in the fish of the rail throughout the length of the splice bar.

To avoid the disadvantages mentioned above, this invention contemplates a rail joint in which the splice bar is so formed as to provide a plurality of staggered contact points with the fishing surfaces of the rails whereby the wave motion of the adjacent rails will be transmitted to the splice bar and hard spots thus eliminated.

Another object of the invention is the provision of a splice bar for connecting the adjacent ends of rails, which bar is provided with upper and lower serpentine surfaces forming contact areas and intermediate depressions which are relatively staggered.

A further object of the invention is the provision of a splice bar which is generally serpentine or wavy in plan.

It is well known in the art to provide a splice bar for connecting the abutting ends of rails in such a manner as to, in effect, merely bridge the joint by providing upper supporting means arranged at the junction of the rails and bearing against the fishing surfaces of the bottom of the rails at the ends of the bar, but such a construction does not effectually eliminate hard spots, nor does such an arrangement transmit the wave motion of the adjacent rails to the splice bar in such a way as to result in a wave motion of the joint including the splice bar, nor does such a construction transmit wave motion from the rails to the splice bar and eliminate hard spots.

The invention, therefore, contemplates also the provision of a splice bar which in general is of wave form whereby the wave motion of the rails will be taken up by the bar and hard spots normally resulting from pounding of the wheels on the rails thus eliminated.

Other objects and advantages of this invention will be apparent from the following description taken in conjunction with the accompanying drawings in which:

Figure 1 is an elevational view of a rail joint showing the splice bar of the present invention, and Fig. 2 is a sectional view on the line 2—2 of Fig. 1.

Referring now more particularly to the drawings in which similar characters of reference designate similar parts in the several views, A and B designate adjacent rail ends each having a head 2, a web 3 and the base flange 4 providing the fishing surfaces 6 and 8 respectively with which the splice bar C of the present invention is adapted to contact; the bar being secured within the fishing spaces of the rails and to the web 3 by suitable fasteners such as the bolts 10.

The bar is, in general, serpentine in form, or to be more specific, wavy, said bar being formed with alternate projections and depressions 12 and 14 respectively on its upper and lower edges. Due to the wavy form of the bar, it will be apparent that the respective projections and depressions are arranged in staggered relation.

In applying the bar across the junction of the rails, it is to be understood that the bar is to be formed of a predetermined size so that the projections 12 will form contacting portions engaging the fishing surfaces 6 and 8; the contacting portions on the upper and lower edges being spaced by the depressions 14.

With the bar C applied as shown, it will be apparent that the bearing points or contacting portions of the upper and lower edges of the bar which receive the down-thrust from the rail resulting from wheel pounding, are respectively in different vertical planes, thereby relieving the entire joint of hard spots and providing a construction which effectually takes up the wave motion to which the joint is subjected in use.

From the above description, it is believed that the invention will be fully apparent to those skilled in the art, and it will further be apparent that the splice bar herein shown and described provides for a plurality of contacting portions for the fishing surfaces of the rails, which contacting portions are arranged in staggered relation whereby the wave motion of the rails is transmitted to the bar with a total elimination of hard spots which are usual in the ordinary type of rail joint. It is to be understood that the drawings herein are for illustrative purposes only and that various changes in the form and proportions of the device may be made within the scope of the appended claims without departing from the spirit of the invention.

What I claim is:

1. A device of the kind described comprising a bar having the upper and lower surfaces thereof provided with alternate projections and depressions arranged respectively in staggered relation.

2. A splice bar for rail joints having a plurality of spaced contacting areas on the upper and lower edges thereof for engaging the fishing surfaces of adjacent rails, said contacting areas being arranged in staggered relation.

3. In a rail joint, a splice bar of serpentine form providing contacting areas for engaging the fishing surfaces of adjacent rails in different vertical planes.

4. In a rail joint, a splice bar having a plurality of contacting areas on the upper edge thereof for engaging the fishing surface of the heads of adjacent rails, and a plurality of contacting areas on the lower edge of the bar arranged in staggered relation to the first named contacting areas to engage the fishing surface of the flanges of the rails in different vertical planes from those of the contacting areas of the upper edge.

5. In a rail joint, means for eliminating hard spots comprising a splice bar connecting the webs of the rails and having spaced contact areas on the upper and lower edges thereof arranged in relatively staggered relation for engaging the fishing surfaces of the rails in rela..  .ly different vertical planes to take up the wave motion imparted to the rails.

6. A device of the kind described comprising a bar having spaced projections on its upper and lower surfaces arranged respectively in staggered relation to engage the fishing surfaces of adjacent rails.

7. A device of the kind described comprising a bar adapted to connect adjacent rails and having the upper and lower surfaces thereof provided with alternate projections and depressions arranged respectively in staggered relation to support the rails the full length of said bar.

In witness whereof I have hereunto set my hand.

NICHOLAS A. DOYLE.